US009020904B2

(12) United States Patent
Douglis et al.

(10) Patent No.: US 9,020,904 B2
(45) Date of Patent: Apr. 28, 2015

(54) METHODS, SYSTEMS AND PRODUCTS FOR GENERATING WEB PAGES

(75) Inventors: Frederick Douglis, Bernards Township, Somerset County, NJ (US); Sonia Jain, Okemos, MI (US); John C. Klensin, Cambridge, MA (US); Michael Rabinovich, Gillette, NJ (US)

(73) Assignee: RPX Corporation, San Francisco, CA (US)

( * ) Notice: Subject to any disclaimer, the term of this patent is extended or adjusted under 35 U.S.C. 154(b) by 217 days.

(21) Appl. No.: 12/576,285

(22) Filed: Oct. 9, 2009

(65) Prior Publication Data

US 2010/0023493 A1 Jan. 28, 2010

Related U.S. Application Data

(63) Continuation of application No. 11/742,918, filed on May 1, 2007, now Pat. No. 7,620,898, which is a continuation of application No. 09/872,893, filed on Jun. 1, 2001, now Pat. No. 7,216,297.

(60) Provisional application No. 60/234,832, filed on Sep. 22, 2000.

(51) Int. Cl.
*G06F 7/00* (2006.01)
*G06F 9/44* (2006.01)

(52) U.S. Cl.
CPC ....... *G06F 9/4443* (2013.01); *Y10S 707/99933* (2013.01)

(58) Field of Classification Search
USPC ............ 707/999.104, 999.102, 609, 836, 687
See application file for complete search history.

(56) References Cited

U.S. PATENT DOCUMENTS

| 5,627,980 | A |   | 5/1997  | Schilit et al.          |
|-----------|---|---|---------|-------------------------|
| 5,680,605 | A | * | 10/1997 | Torres ............... 1/1 |
| 5,761,683 | A |   | 6/1998  | Logan et al.            |
| 5,774,873 | A |   | 6/1998  | Berent et al.           |
| 5,945,989 | A |   | 8/1999  | Freishtat et al.        |
| 6,021,435 | A |   | 2/2000  | Nielsen                 |
| 6,023,685 | A |   | 2/2000  | Brett et al.            |
| 6,035,330 | A | * | 3/2000  | Astiz et al. .......... 709/218 |
| 6,144,962 | A | * | 11/2000 | Weinberg et al. ....... 1/1 |
| 6,161,127 | A |   | 12/2000 | Cezar et al.            |
| 6,253,204 | B1| * | 6/2001  | Glass et al. .......... 1/1 |

(Continued)

FOREIGN PATENT DOCUMENTS

EP    918277    5/1999

OTHER PUBLICATIONS

Brusilovsky et al., "Visual Annotation of links in adaptive hypermedia," Proceeds of ACM CHI'95 Conference on Human Factors in Computing Systems, vol. 2 of Short Papers: Agents and Anthropomorphism, 1995, 4 pages.

(Continued)

*Primary Examiner* — Khanh Pham
*Assistant Examiner* — Eliyah S Harper
(74) *Attorney, Agent, or Firm* — Howison & Arnott, LLP (57) ABSTRACT

Methods, systems, and products generate web pages using elidable links to additional content. When a link is selected in a web page, elision is used to automatically remove a URL and its associated content from the web page, thus reducing previously visited material. When a user selects an elision-enabled link, the link is not displayed during subsequent displaying of the same web page.

19 Claims, 8 Drawing Sheets

```
Preferences: Elision

Clicking on an elidable link:
    ○ Does nothing.
    ○ Elides the content associated with the link in the current page.
    ● Elides the content associated with the link in the current page for
       [ 20 ] days.

Links are elided:
    ○ When selected.
    ● When selected with the [CTRL] modifier.

[ Cancel ]   [ OK ]
```

(56) References Cited

U.S. PATENT DOCUMENTS

| | | | |
|---|---|---|---|
| 6,271,846 B1 | 8/2001 | Martinez et al. | |
| 6,311,177 B1 | 10/2001 | Dauerer et al. | |
| 6,477,544 B1 * | 11/2002 | Bolosky et al. | 1/1 |
| 6,701,350 B1 | 3/2004 | Mitchell | |
| 6,857,102 B1 | 2/2005 | Bickmore et al. | |
| 6,925,496 B1 * | 8/2005 | Ingram et al. | 709/224 |
| 7,058,700 B1 * | 6/2006 | Casalaina | 709/220 |
| 2005/0015732 A1 | 1/2005 | Vedula et al. | |

OTHER PUBLICATIONS

Douglis et al., "Click-once Hypertext: Now you see it, now you don't" AT&T Labs, Sep. 22, 2000, 16 pages.

Douglis et al., "Sever-side Tracking of New Documents" AT&T Labs—Research, Sep. 10, 1999, 4 pages.

Rao et al., "A Proxy-Based Personal Portal" Proceedings of the $1^{st}$ International Workshop on Web Site Evolution, Atlanta, GA, Oct. 1999, 7 pages.

Kiyomitsu et al., "Web Reconfiguration by Spatio-Temporal Page Personalization Rules Based on Access Histories," Symp on Application and th internet (SAINT), pp. 85-84, Jan. 2001, 8 pages.

Unnkown, "Internet Difference Engine", May 4, 1998, 2 pages.

Unkown, "Individual: Track Changes on the Web," Mar. 2001, 2 pages.

Unkown, "The Informant," Dec. 1996, 5 pages.

Fred Douglis, Thomas Ball, Yih-Farm Chen, and Eleftherios Koutsofios. The AT&T Internet Difference Engine: Tracking and viewing changes on the web. *World Wide Web*, pp. 27-44, Jan. 1998.

Kristina Hook, Asa Rudstrom, and Annika Waem. Edited adaptive hypermedia: Combining human and machine intelligence to achieve filtered information. In *Workshop on Flexible Hypertext*, Apr. 1997.

F. Douglis, T. Ball, Tracking and Viewing Changes on the Web, 1996 USENIX Technical Conference, p. 1-13.

* cited by examiner

FIG. 1

```
<HTML><HEAD><TITLE>Elision Demo Page</TITLE>
<script src = "smash.js"></script>
<script language = "JavaScript">
 var page = "<BODY BGCOLOR=#ffffff>\
<hr>\
<ELIDE><INPUT TYPE=hidden NAME=\"url0\" VALUE=http://www.uspto.gov>\
Section 1<p><A HREF='javascript:elide_and_display(1,
\"http://www.uspto.gov\")'>United States Patent and Trademark Office
(USPTO)</A><p>\
This textual content, associated with the previous anchor, is elided
when the above anchor to the USPTO is selected.<p>\
</ELIDE>\
<hr>\
<ELIDE><INPUT TYPE=hidden NAME=\"url1\"
VALUE=http://www.loc.gov/copyright/>\
Section 2<p>This textual content and the following graphic, both
associated with the subsequent anchor, are elided when the below\
anchor to the U.S. Copyright Office is selected.<p>\
<IMG SRC=graphic_content.gif><p><A HREF='javascript:elide_and_display(2,
\"http://www.loc.gov/copyright/\")'>\
U.S. Copyright Office</A>\
</ELIDE>\
<hr>\
Section 3<p><A HREF='http://www.whitehouse.gov'> The White House Home
Page</A> (This link is not elidable)\
<hr>\
<a href ='javascript:undoThis()'> <i>Restore elided links</i></a> \
</BODY></HTML>";
</script>
</head>
<script>
displayPage(page);
</script>
```

FIG. 2

```
var cookieString = document.cookie;

// GET COOKIE FUNCTION
function getCookie(name) {
  name += "=";
  var i = 0;
  while (i < cookieString.length) {
    var offset = i + name.length;
    if (cookieString.substring(i, offset) == name) {
      var endstr = cookieString.indexOf(";", offset);
      if (endstr == -1) endstr = cookieString.length;
        return unescape(cookieString.substring(offset, endstr));}
    i = cookieString.indexOf(" ", i) + 1;
    if (i == 0) break; }
    return null; }

// SET COOKIE FUNCTION
function setCookie(name, value) {
  if (value != null && value != "")
    document.cookie=name + "=" + escape(value) + "; ";
  cookieString = document.cookie; } function elide_and_display(num,clickedURL) {
  var cookieValue = getCookie("CountHits") || 1;
  if((getCookie("CountHits") == null) || (getCcokie("CountHits") == "null")){
    cookieValue = " " + num + " ";}
  else {
    cookieValue = cookieValue + num + " ";}
  setCookie("CountHits", cookieValue);
  window.open(clickedURL);
  history.go(0);
}

// DOES THE MAIN FUNCTION CALLING, IS ACTIVATED WHEN A LINK IS CLICKED
// IF YOU USE THE HISTORY.GO(0) THEN THE PAGE RELOADS.
// SO UNCOMMENT THE HISTORY.GO(0) AND ALSO UNCOMMENT THE OPENWINDOW()
// THIS WAY THE LINK WILL OPEN IN A NEW WINDOW.  ALSO COMMENT OUT THE
// CALL TO LOCATE TAGS AND PARSING!

// CAN BE USED IF YOU WANT TO OPEN THE LINK IN A NEW WINDOW
function openWindow(sURL){
  window.open(sURL); }

// ACTIVATED ON THE ONCLICK FEATURE WHEN YOU CLICK THE UNDO LINK
function undoThis() {
  var ss = null;
  document.cookie = "CountHits=" + escape(ss) + ";";
  cookieString = document.cookie;
  history.go(0);}
```

FIG. 3

```
//ELIDE_LINKS FUNCTION
// RESPOSIBLE FOR REMOVING THE LINKS CLICKED
function elide_links(myStr, Clicked) {
  var linksClicked = 0;
  var location = 0;
  var flag = 0;
  var marker = myStr.lastIndexOf(' ');
  while(flag == 0){
    var begin = myStr.indexOf(' ', location);
    if(begin == marker) flag = 1;
    else {
      location = begin + 1;
      var end = myStr.indexOf(' ', location);
      linksClicked = myStr.substring(begin, end);

var replaceThis = Clicked[eval(linksClicked)];
      splitString = page.split(replaceThis);
      page = splitString[0].concat(splitString[1]); }}
    return page;
}

// MAKE ARRAY FUNCTION
function makeArray(num) {
  this.length = num;
  for(var i = 1; i <= num; i++) {
    this[i] = 0; }
  return this; }

// LOCATE TAGS (ELISION TAGS) FUNCTION
function locateTags(page){
  var count = 1;
  var location = 1;
  var marker = page.lastIndexOf("<ELIDE>");
  var aString = new makeArray(10);
   while(count != 0){
    var holder1 = page.indexOf("<ELIDE>", location);
    var holder2 = page.indexOf("</ELIDE>", location);
    aString[count] = page.substring(holder1, holder2 + 8);
    count++;
    if(holder1 == marker){
       count = 0;}
    location = holder2 + 1;}
  return aString;}
```

FIG. 3
(continued)

```
// LOADING FUNCTION (ONLY CALLED ON PAGE RELOADS)
// CHECK TO SEE WHAT IS IN THE COOKIE
function displayPage(page) {
  var sStr = getCookie("CountHits") || 1;

if(getCookie("CountHits") != null){
     var wasClicked = locateTags(page);
     var toDisplay = elide_links(sStr, wasClicked);

document.open();
     document.writeln(toDisplay);
     document.close();} else {
     document.open();
     document.writeln(page);
     document.close();} }
```

METHODS, SYSTEMS AND PRODUCTS FOR GENERATING WEB PAGES

CROSS-REFERENCE TO RELATED APPLICATIONS

This application is a continuation of U.S. application Ser. No. 11/742,918, filed May 1, 2007, and now issued as U.S. Pat. No. 7,620,898, which is a continuation of U.S. application Ser. No. 09/872,893, filed Jun. 1, 2001, and now issued as U.S. Pat. No. 7,216,297, which claims the benefit of Provisional U.S. Application No. 60/234,832, filed Sep. 22, 2000, with each application incorporated herein by reference in its entirety.

STATEMENT OF COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF TECHNOLOGY

The invention relates to Internet web pages. More specifically, the invention relates to a self-modifying web page that has the ability to automatically remove a hyperlink and associated content after the hyperlink has been selected.

BACKGROUND

Web pages often contain lists of many hyperlinks (also known as anchors). Some of these web pages contain transient data such as news items that are typically viewed only once via that page and then not again. Examples of such web pages include search engines, news clipping services, and notification agents such as the AT&T Internet Difference Engine (AIDE).

When a user selects, or clicks, a hyperlink on a web page, the hyperlink may be marked as having been visited. When the user returns to the page from which the hyperlink was originally selected, the previously visited hyperlink is typically displayed in a different color from hyperlinks that were not previously visited. This distinguishes visited hyperlinks from non-visited hyperlinks. However, changing color is often insufficient in relation to a user's needs, if it is possible at all.

First, a web page may become cluttered when a large number of hyperlinks are placed on the page, thus reducing user efficiency. Simply changing the color of a hyperlink does not reduce clutter on the page. Second, it may be difficult or impossible to discern color differences, especially on web pages with non-standard color backgrounds. Therefore, a user may not be able to differentiate clearly between visited and non-visited hyperlinks. Third, links are not necessarily textual, nor is any text associated with a link necessarily limited to the actual hyperlink. That is, there may be multiple page fragments associated with each hyperlink, consisting of text and/or graphics. Changing the color only changes any hyperlink text, not the associated graphics or non-hyperlink text. Finally, on hand-held devices, such as PDAs, screen real estate is at a premium, and color capability if provided is often limited. Because of the size, resolution, and color limitations of most PDAs, not as many links may be viewed on the screen as on a conventional (larger and higher resolution) desktop or laptop computer display. Simply re-coloring links does not provide additional space for new links to be displayed. Because many PDAs do not provide color displays, PDAs often display color as shades of gray. Therefore, it is often difficult or even impossible to detect color differences between shades of gray.

Thus, it would be an advancement in the art, rather than simply relying on changes in text color or other similar techniques, to be able to remove hyperlinks, as well as the text and other content associated with it after a user selects the hyperlink. This can improve user efficiency by focusing on what is actually new and/or different for that user.

It would also be an advancement in the art to provide disappearing hyperlinks on a selective basis. That is, the choice of which hyperlinks should be treated as disappearing may be decided by the web page author.

BRIEF SUMMARY

In a first embodiment, there is a computer-implemented method of displaying an anchor on a web page. The method includes the steps of displaying a first web page on a display screen, wherein the first web page comprises a first anchor corresponding to a first URL, receiving a user input corresponding to the user selecting the first anchor, and redisplaying the first web page, wherein content associated with the selected anchor is elided.

In a second embodiment, there is a computer readable medium comprising computer readable instructions that, when executed by a processor, cause a computer to perform a set of steps. The set of steps includes the steps of displaying on a display screen, a first web page, wherein the first web page comprises a first anchor corresponding to a first URL, receiving a user input corresponding to the user selecting the first anchor, and redisplaying the first web page, wherein content associated with the selected anchor is elided.

In a third embodiment, there is a method of displaying hyperlinks in a web page. The method includes the steps of displaying elidable hyperlinks in a first color on a display screen, and displaying non-elidable hyperlinks in a second color, different from said first color, on the display screen.

In a fourth embodiment, there is a method of selecting anchors to elide on a web page. The method includes the steps of displaying a first web page on a display screen, wherein the first web page comprises a first anchor corresponding to a first URL, and receiving a user input corresponding to the user selecting the first anchor. When the user input comprises a second predefined input in addition to selecting the first anchor, then the method includes the step of redisplaying the first web page, wherein content associated with the selected anchor is elided. When the user input does not comprise a keystroke in addition to selecting the first anchor, the method includes the step of redisplaying the first web page, wherein content association with the selected anchor is not elided.

In some embodiments, the elided content includes text.

In some embodiments, the elided content comprises graphics.

In some embodiments, the elided content comprises the selected anchor.

In some embodiments, the selected URL is displayed in the same window as the page from which the URL was selected. In other embodiments, the URL is displayed in a new window.

In some embodiments, elision may be undone, such that previously elided content is displayed during subsequent page views.

DETAILED DESCRIPTION

This invention relates to a system for automatically removing content from a web page when hyperlinks, also referred to as anchors, are selected. These are referred to as "click-once" links or elidable links, as the user no longer sees the anchor or hyperlink and its associated content, after the hyperlink has been selected. Hyperlinks, or anchors, are interactive links in a web page that direct a user's browser to a web page found at a specified universal resource locator (URL). Making anchors, and optionally other associated content, click-once allows a web page to avoid clutter and provides visual feedback to a user. Unlike other adaptive hypertext systems, the invention may be used to generate pages on a web server, but allow each user's web browser to update the content automatically and efficiently on the client computer.

The process of hiding click-once links and their associated text is referred to as elision. Eliding a link suppresses the link, and optionally content associated with the link. The content is not necessarily removed completely. A mechanism may be provided for restoring a previously elided link on demand. Restoration gives users the ability to back up and recover information they had prior to clicking on the link. This is useful when a user wants to refresh his or her memory about where he or she found the link in the first place, or when clicking on a link results in an error such that the user did not actually receive the information contained in the selected URL.

Figure 1:
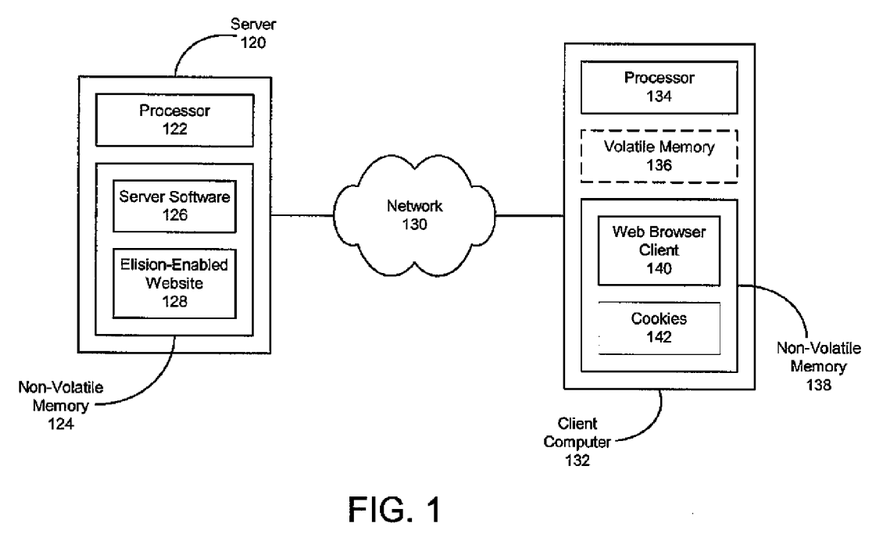
FIG. 1 shows a system adapted to perform an embodiment of the invention.

In one embodiment, shown in FIG. 1, elision is performed by the client in a client-server environment consisting of a client computer 132 and a web server 120. The server, however, can also perform removal of click-once links. By performing elision on the client side, the burden is on the browser to perform the necessary tasks, and this also avoids unnecessary network latency.

In FIG. 1, the server 120 has a processor 122 and at least a non-volatile memory 124. An optional volatile memory (not shown) may also be included. The memory 124 stores server software 126 and an elision-enabled website 128. The server software 126 is any software used to serve the website to client computers, as is known in the art. The elision-enabled website 128 is a website adapted to include at least one elidable link in accordance with the invention.

Client computer 132 has a processor 134, optional volatile memory 136, and a non-volatile memory 138. The non-volatile memory 138 (and 124) may be any computer-readable medium on which computer readable data and/or instructions may be stored such that the data and/or instructions are not lost when the power is disconnected. The non-volatile memory stores at least a web browser client 140, any number of which is commercially available. The non-volatile memory also stores cookies 142 created in an embodiment of the invention, as discussed below. Other embodiments are possible where cookies are not used. Client computer 132 and server 120 are connected via network 130. The network may be a global computer network, such as the Internet, or a LAN, WAN, a corporate intranet, or the like.

Figure 2:
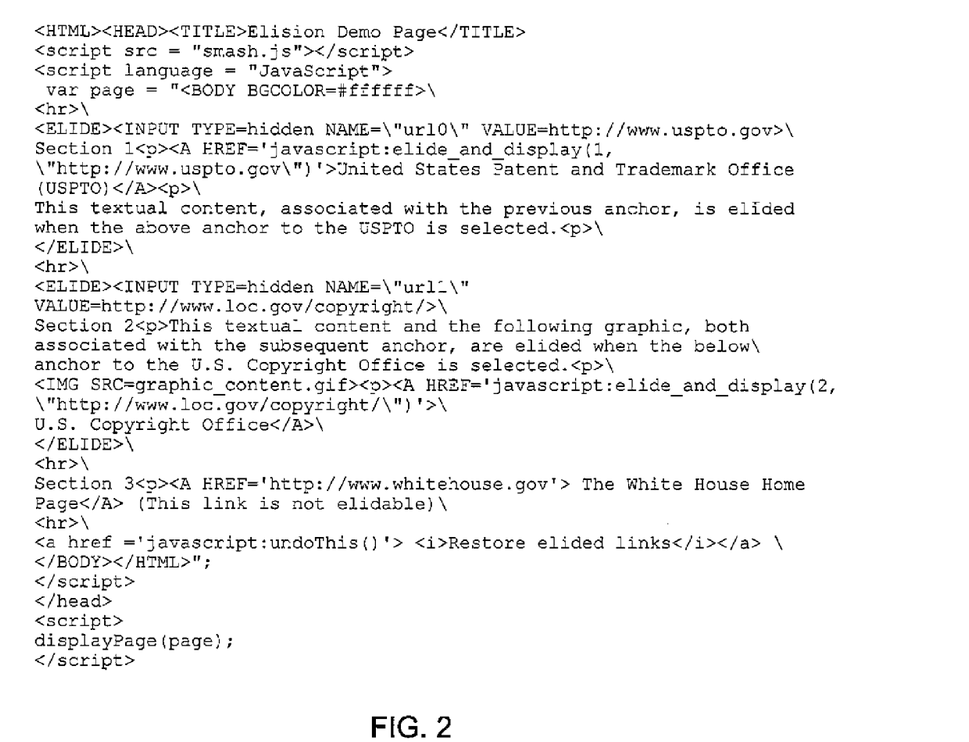
FIG. 2 shows a source file for an elision-enabled web page according to an embodiment of the invention.

With reference to FIGS. 2-5, the invention may be implemented in software modules using JavaScript, Java, or any other interpretive language that may be adapted to work interactively with web pages. In one embodiment, an interface in JavaScript is used. The software modules allow click-once links to be flagged in the enclosing HTML through a combination of an indirection through a JavaScript function in an anchor and an additional HTML tag. Generally, clicking on a standard non-elidable anchor in a web page directly causes the browser to open the associated URL's web page in the same or a different window. An indirection, on the other hand, is where the anchor institutes a function call to JavaScript or some other programming language, which in turn performs one or more functions before loading the associated URL. FIG. 2 shows an example of HTML code for a web page that uses elision. A standard hyperlink that does not use indirection may be found in lines 24-25. The other two hyperlinks in the web page, found in lines 7-9 and 19-21, both use indirection through a JavaScript call. Other methods of indirection are also possible.

Click-once links may be associated with content regions that are enclosed by a special HTML tag; these regions typically enclose the links themselves, and may enclose other content that is not part of each hyperlink, or multiple related adjacent hyperlinks. As shown in FIG. 2, the <ELIDE> tag may be used for this purpose. Using a special HTML tag for elidable links allows the web content author to control which links are elidable and what content to elide, as elision may not be appropriate in all circumstances. For instance, a page with a hand-crafted or unique layout might look incorrect if regions of the page were suddenly removed. Thus, in one embodiment, only the author (or authoring tool) may designate which links may be elided.

One embodiment of the invention uses cookies to record information about which links have been followed. Cookies, as generally used in web page development, are well known in the art. Typically, cookies are used by websites to store personally identifying and login information on a user's computer. The use of cookies by the invention is unconventional. In addition to passing state information to the server for optional use in subsequent page generation, the cookies store information for the JavaScript code that executes on the client. The cookies are used in place of JavaScript variables, which would be reinitialized each time the page is reloaded. The cookies ensure that when a user revisits a web page, any previously visited elided link will again be elided.

Elision was developed to meet certain criteria. First, elision should be customizable. That is, users (e.g. an author or end-user) can optionally specify whether links should be elided in the first place. Second, elision should be immediate. The effect of eliding a link should be visible immediately, not requiring a page reload/refresh. If a user follows the link by opening a new window, still displaying the original page, elision should take place in the old window as well as the new window, if applicable. If the user follows the link in the same window, then the change should be apparent if and when the user backs up to the previous page. Third, elision should be durable. In most cases, links that are selected should be elided not only in the user's current view of the enclosing page, but also in subsequent regenerated versions of that page. Fourth, elision should be reversible. A user should be able to view the page with all links included, or to back up and reinstate any previously elided link(s). Fifth, elision should be transparent. Click-once links should require little, if any, special support from browsers. Explicit software installation or reconfiguration by users should not be required. For examiner, downloading a plug-in or ActiveX control once may be acceptable, but little new installation should be attempted. In this regard, using functionality that users typically already enable, such as JavaScript, is preferable. Sixth, elision should not impact browser performance. The impact on performance of supporting click-once links should at most be negligible. The inclusion of click-once links should not affect the cachability of pages, or require that extra pages be downloaded In one embodiment, JavaScript and HTML are used to implement the invention. It should be noted that Microsoft's Internet Explorer and Netscape's Navigator browsers do not exhibit identical behavior when given the same piece of JavaScript. However, by first determining which browser is being used, Netscape or Internet Explorer specific code may be provided. This technique is known in the art. Other scripting languages or downloadable code such as Java applets can also be used as is known in the art.

Figure 3:
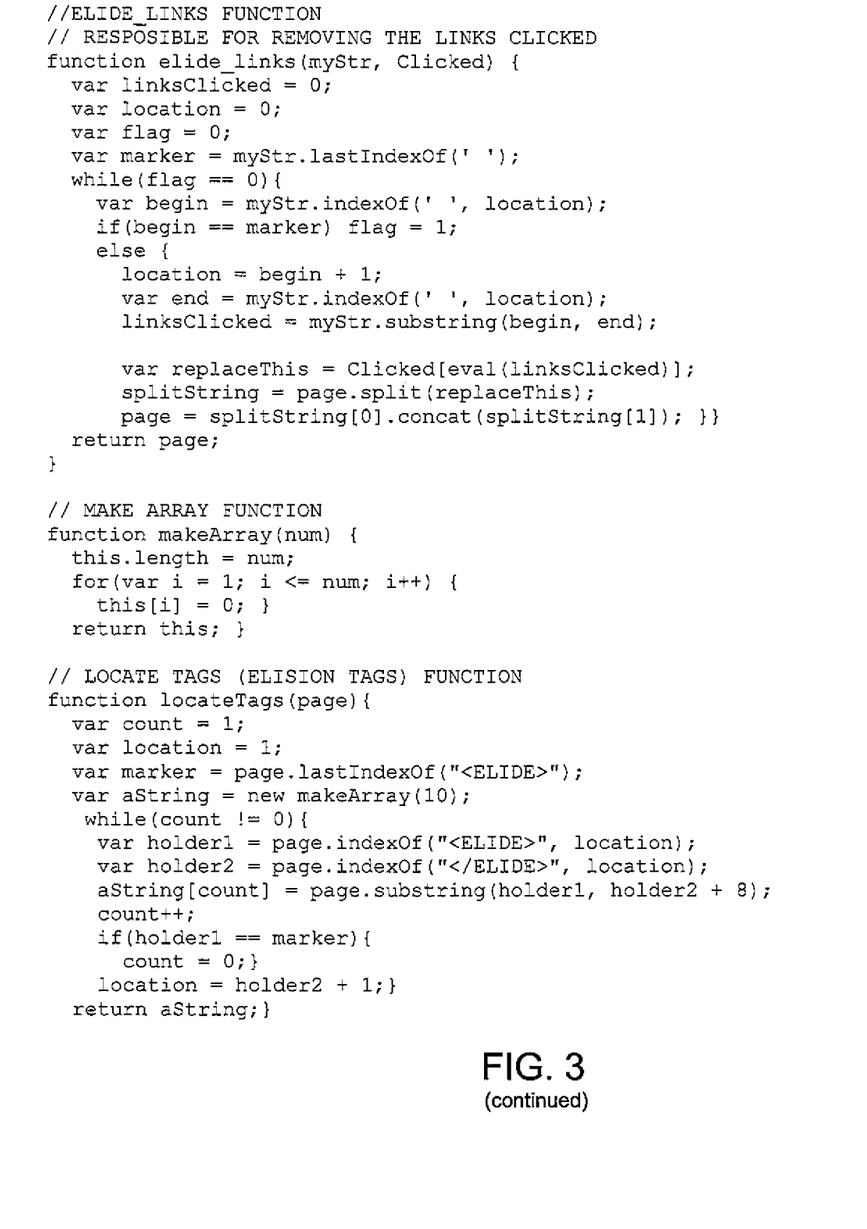
FIG. 3 shows JavaScript code used in the embodiment used by the web page source file in FIG. 2.

In this embodiment, there may be a separate cachable file called elision.js, shown in FIG. 3, that contain the code to invoke when a link is clicked on, the code to undo previous elisions, and any necessary support functions. This file may be generic for all pages with elidable links. Thus, once cached, it should not need to be re-downloaded for each web page. The principal functions in elision.js may be as follows:

elide_and_display: This function may add the identifier of the selected URL to the page's cookie, described below, and loads the selected URL in the same or a different window, depending on the embodiment.

Elide_links: This function may be used to remove previously selected elidable links and their associated content from a web page before it is displayed.

DisplayPage: This function may be used to display the web page, eliding previously selected elidable links.

UndoThis: This function may be used to undo any previously performed elision.

As should be apparent to those skilled in the art, more or less functions may be used, depending on desired functionality and design choices.

Referring again to FIG. 2, an elision-enabled web page may be provided in a source file with three scripts. The first script, at line 2, loads the elision source file above. The second script, at lines 3-29, serves to define a variable containing the web page information to be displayed. Elidable links on the page may be identified using link identifiers. The identifiers may be unique to the content regions to be elided. That is, more than one content region may be associated with the same anchor, such that when the specified anchor is selected, both content regions may be elided. In the example shown in FIG. 2, identifiers are numeric identifiers as illustrated at lines 7 and 19. This identifier is passed to the function elide_and_display when the link is selected. The function elide_and_display, as described above, adds the link ID to the document's cookie. It is also possible to name the regions, similar to internal anchors within an HTML page, instead of using numeric identifiers.

The third script, at lines 31-33, gets executed when a client browser loads the source file. This script invokes the displayPage function that modifies and displays the page, eliding all links contained in the current value of the cookie before displaying the page. Thus, the first visit to an elision-enabled page involves the steps of loading the source page and invoking the displayPage function. Initially, because the cookie contains an empty elided link set, the original page is displayed unaltered. When a user clicks on an elidable link, elide_and_display adds this link to the elided link set in the cookie. Subsequent visits to the page will load the original source file and execute the displayPage function, which will bring the page to its current state by eliding all content areas associated with anchors specified in the current cookie corresponding to that page.

The above implementation displays selected URLs in a new window from where the initial elision-enabled page was displayed. That is, when an elidable link is selected, the browser opens a new window (target window) and displays the web page at the selected URL in the target window. The elision takes effect immediately in the original (parent) window.

In another embodiment, the browser may display a selected page in the same window as the window in which the elision-enabled page is displayed. In this embodiment, the elision may take effect when the user revisits the initial page, either by stepping back in the browser use history (for instance, by pressing the 'back' button), by entering the page URL explicitly, or by clicking on a link to that page from another document. Web pages containing dynamic data may be treated differently, as discussed below.

Figure 4:
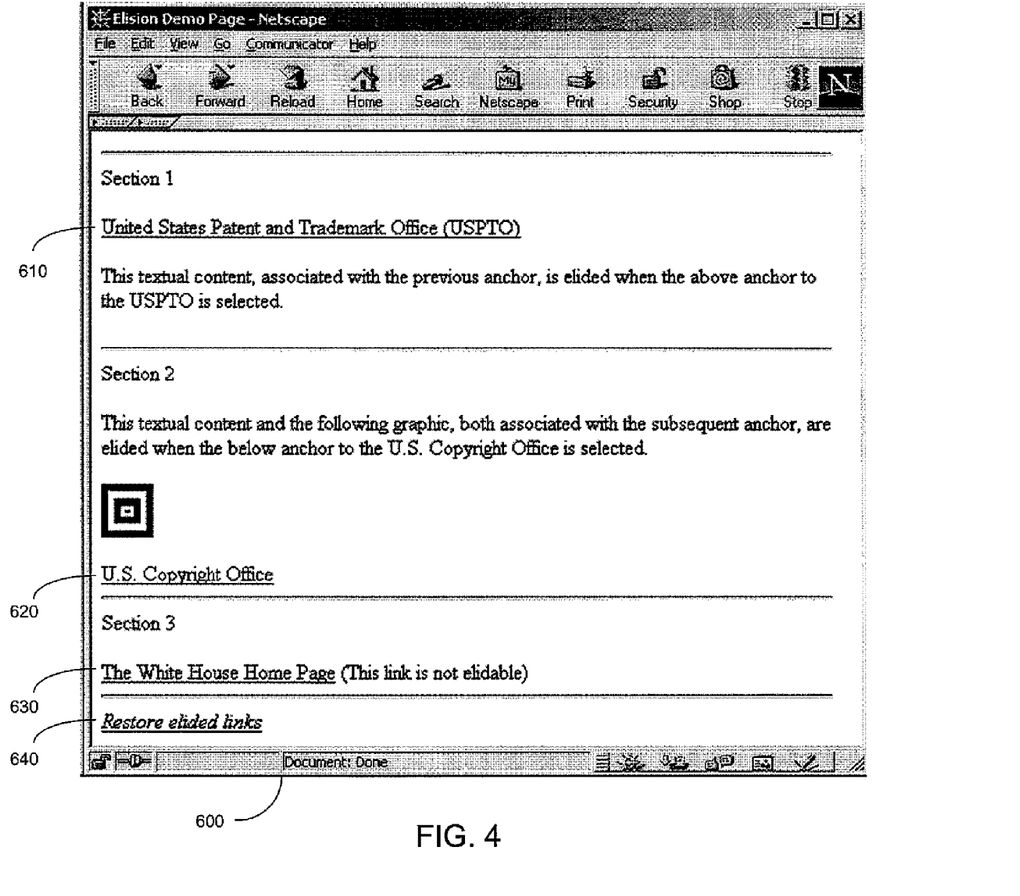
FIG. 4 shows an elision-enabled web page before performing elision.
Figure 5:
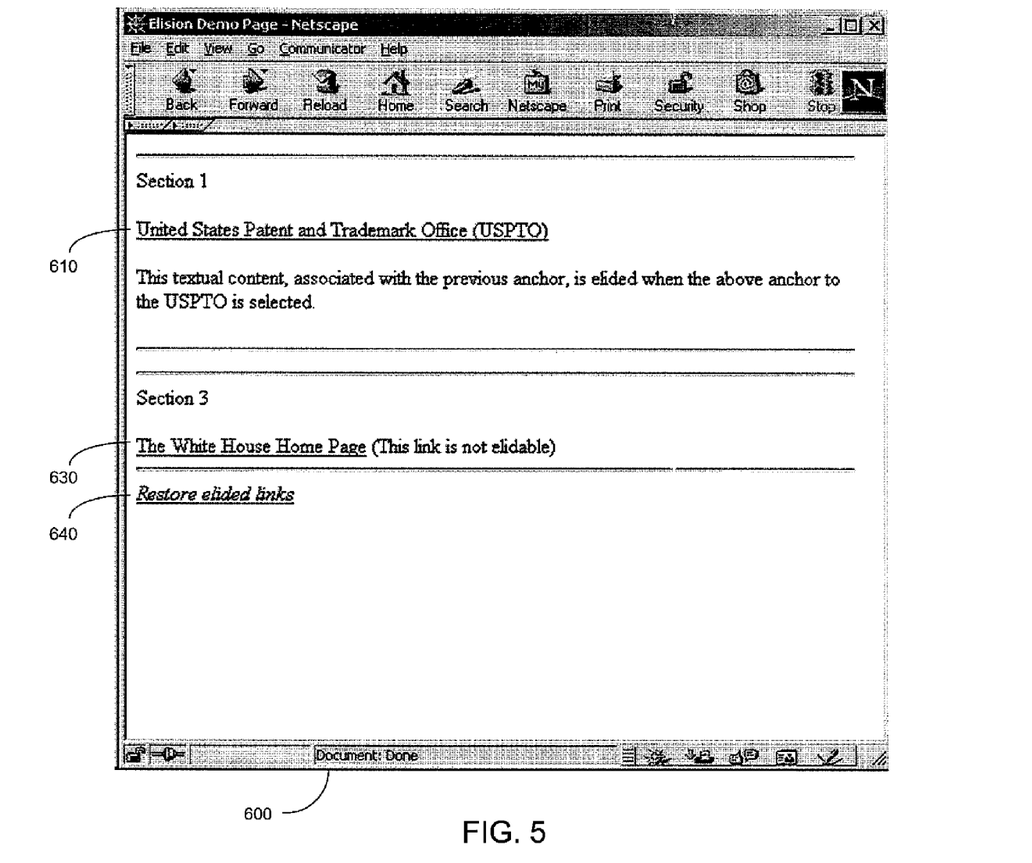
FIG. 5 shows the web page in FIG. 4 after eliding Section 2.

By way of example, FIG. 4 shows an elision-enabled web page 600 before any elision has been performed. The web page 600 comprises a plurality of links 610, 620, 630, 640. There may be no visual characteristic to distinguish an elision-enabled web page, such as the web page 600, from a non-elision-enabled web page until after elision has been performed. The differences, however, are apparent in each web page's behavior and presentation after elision has occurred. FIG. 5 shows the web page 600 after a user has selected link 620, eliding Section 2. Section 2 is present in the web page in FIG. 4, and absent from the web page in FIG. 5. If the user subsequently selects the link 640 to restore elided links, the web page will revert to its original state as shown in FIG. 4, including Section 2. Restoring elided links is further discussed below.

When using a dynamically generated web page, the need to reload the page presents unique problems. With current browsers, the JavaScript function to redisplay the current page typically causes the browser to confirm that the page is current, thus contacting the server with an HTTP "Get If-Modified-Since" command. Static content can be served efficiently (with a "Not Modified") response but dynamic content will be regenerated. That is, a dynamic page results in the recreation of the page on the server, which is computationally expensive and defeats the purpose of performing elision on the client. The system may be modified to write the dynamic HTML to a static file with a URL that has no CGI (or other dynamic) features, and then redirect the browser client to load that file, thereby reducing the overhead of dynamic page generation.

In another embodiment, the CGI front-end is allowed to be queried, but it responds immediately with a not-modified response rather than regenerating the page. This may require a change in the way the page is requested, so that the browser does not infer that the page is uncachable by the presence of CGI features, such as the characters "?" and "&" in the URL. It would then typically perform a "GET If-Modified-Since" request rather than bypassing the cache and doing a fresh "GET" request.

In some embodiments, eliding content may be more completely integrated with the browser, such that the page need not be freshly retrieved in order to redisplay it with new content elided. This functionality would obviate the need for the static file or modified CGI interface as in the preceding two paragraphs.

In some embodiments, elision may be adapted so that when a selected URL is unavailable or results in some other error, the link is not subsequently elided. That is, a link is only elided during subsequent loads after an initially successful load.

In other embodiments, as previously stated, elision may be undone. The undo feature may be all or nothing. That is, a user can select to undo all elision, thus displaying all links in a web page on the display screen regardless of whether they had been previously elided. Alternatively, a user may change the undo mechanism from being all-or-none to being incremental. In this manner, a user may manually restore a region of a web page without restoring other regions in it. This may also be used to correct elision in embodiments that do not test for successful loads of URLs before eliding the corresponding hyperlink. Incrementally undoing elision may be performed by, upon receiving an undo request, removing the most recently elided link from the cookie corresponding to the current web page, and then redisplaying the page using the display Page function.

In another embodiment, the system may elide links in multiple windows within a single browser. Unlike the above embodiment, where links are generally numbered within a single document, and only that web page is updated when a click-once link is selected, in this embodiment the client forces an update to other open windows so that the same link is removed from any or all of them when present. This is accomplished by spanning cookies between documents and updating each document when appropriate. Cookies that span documents are known in the art. Similarly, elision capabilities may also allow multiple elision regions within a single page to be elided by a single click. The multiple elision regions may be multiple instances of links to the same URL, or they may be one link to a URL and other non-linked content that relates in some way to the link. The relationship need only be that a web page author decided that, when the user clicks a specified link, the chosen content should be elided. The regions may be associated by using the same <ELIDE> tag identifier in the source page variable.

In still another embodiment, some hyperlinks may be assigned a priority value. In this embodiment, not all links are initially displayed on the web page. The elision functions are adapted to replace elided links with other links that have lower priority and are not initially displayed. This may be done by extending HTML to place limits on certain structures, for instance rows in a table, such that the page may contain more elements than would be displayed. As elements that were initially displayed were elided, they would be replaced by other elements. The "priority" may be implicit, based on the ordering of the rows in the table. It would also be possible to modify the client to place such limits, without formally extending HTML.

For example, a table as defined by HTML or other markup language may have an additionally defined value with which it is associated called MaxRows, where MaxRows is an integer value. When the web page is displayed, for any table with a MaxRows variable defined, only up to the first MaxRows rows of the table will be displayed, regardless of the number of rows defined in the source file. When a link making up a row of the table is elided, that row will no longer be displayed. Instead, because the other rows are shifted up, the row defined by MaxRows+1 in the source code is displayed at the end of the table. As other rows' links are elided, additional rows may be displayed sequentially as they are defined in the source file.

Many web pages will benefit from the addition of elidable links—particularly, pages that are customized for users based on what each user has seen and/or done in the past. By using elidable links, customization becomes immediate rather than depending on a reload from the server, which also incurs a delay.

Elision may be useful to sites that notify users of changes on the web. Notification to a user typically takes the form of a list of pages that have recently changed, sent via email or available for viewing as a web page. AT&T's Internet Difference Engine (AIDE) is an example of this service. However, a page that is presented to a user as being new or changed since the website was last visited becomes old as soon as the user sees the new version. Prior to incorporating the functionality described herein, when AIDE reported new/changed web pages, it did not remove those pages from the report until the next time the report was generated. Removing the URL references as the user selects each link improves the user interface by providing immediate feedback to the user, making it clear which links have and have not already been selected/visited. In addition, because it is possible for these reports of new pages to have hundreds or thousands of new hyperlinks, users may easily lose track of which links have been followed, even if the browser colors visited links differently than non-visited links. By using elision, the user is only presented with those links that have not yet been visited, thus reducing link clutter on the page.

Another example of link clutter comes from the various portals provided on the Internet. Service providers such as YAHOO! and EXCITE@HOME offer users a single page with customized items such as stock quotes, weather, news, sports and the like. A user can specify a number of items to display in each category, and the service selects the highest priority items for each selected topic such as "world news" and "business." Generally, each article often has a unique URL with which it is associated. Once the user has seen the article, changing the color of the hyperlink provides an indication that a "new" article is no longer new. However, removing the link using elision offers additional flexibility.

In another embodiment, a system may remove a link in order to improve the organization of the remaining elements on the web page. This is useful when a portal tracks what each user sees. In this embodiment, pages that are updated periodically from the server do not reinstate a link that had been previously elided from a previous version of the page. Information regarding previously elided links can be passed back to the server via a cookie, as described above, or another mechanism such as an HTTP POST function. When the page is updated, if a link to a URL which was previously elided remains on the page, the link is elided in the updated version as well.

In another embodiment, because portals may report the same news item in multiple places, such as separate "business" and "technology" categories, the system may be adapted to elide an anchor at each instance across multiple web pages on the same server. That is, once a user has followed a link to a URL from anyplace it is presented, links to that URL may be elided from all web pages where it would otherwise be presented to that user.

Like portals and notification agents, search engines also present a list of links to a user. Like portals, these links are well served by simply color-coding those that are followed, but they can benefit further by being elided after use. This would likely be a matter of personal preference, or an option the user could maintain on the search page or in a cookie.

As previously discussed, a web page author may designate a link as being elidable. In an alternative embodiment, a user viewing a web page may designate a link to be elided. That is, a browser client may be adapted to recognize an elision keystroke when a user selects an anchor. For example, in one conventional browser, when a user selects an anchor while holding down the SHIFT key, the associated URL is opened in a new window. In another conventional browser, when a user selects an anchor while holding down the SHIFT key, the file located at the associated URL is saved to disk. A similar technique (i.e. using a different special keystroke when selecting an anchor) may be used when the user wants to view the associated URL, but afterwards have the link elided on subsequent page views. For instance, selecting a link while holding down the CTRL key may cause the URL to be loaded in the browser window, but also add the URL to a list of links that are henceforth elided. The next time the user visits a web page on which a link to the same URL is included, the associated content with the URL may be elided.

Where the user selects a link to be elided that the web page author did not originally flag as elidable, various methods may be used to select the content to be elided. In one embodiment, only the hyperlinked text or images within the <A REF> tag are elided. In another embodiment, the content to be elided can be specified using special HTML tags defined in the web page. Other means of specifying content to be elided may easily be envisioned by those skilled in the art.

The list of elided links and/or content may be maintained by the browser, similar to a browser's History file. Just as the History file maintains a list of all URLs visited within the past thirty days, an Elision Log file may maintain a list of all URLs to elide that were selected by the user, optionally within the past thirty days, or some other number of days. The necessary support for this capability may be an added functionality of a browser client, or it may be written in a programming language such as JavaScript in conjunction with extended tags in a markup language such as HTML.

Additionally, a browser with native elision support, i.e. it maintains an Elision Log or the like, may use the same or a separate Elision Log instead of requiring elision-enabled web pages to use cookies. That is, regardless of whether the user or the web page author selects a link to be elided, the elided link may be stored in an Elision Log instead of one or more cookies. Upon subsequent page views, any links stored in the Elision Log may be elided. Optionally, links may be automatically removed from the Elision Log after a set period of time, e.g. thirty days, similar to the time links remain in the History file.

In some embodiments, the browser may be adapted to provide feedback to a user to inform the user which links are elidable. The browser may display elidable links in a specified color different from the color in which non-elidable links are displayed. This technique is similar to the known browser technique of displaying recently visited links contained in the History file in a different color from links which are not included in the history file. In addition, with reference to FIG. 6, the browser may be adapted to allow the user to specify a preference as to the action that the browser takes when a user selects an elidable link. The user may instruct the browser to do nothing. That is, elidable links and their associated content may not be elided even after an elidable link is selected. Alternatively, the content may be elided permanently, or the content may be elided for a user-specified number of days. If the user selects the third option, the user may enter a number of days in the input box provided.

Figure 6:
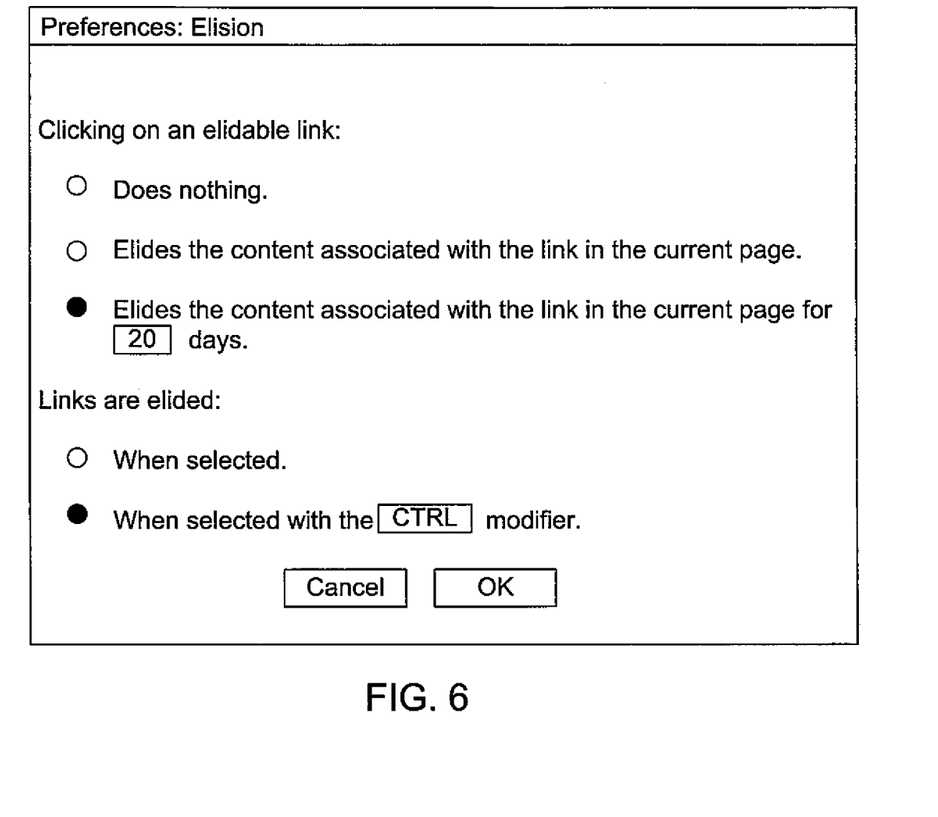
FIG. 6 shows a preferences selection page used by a browser client adapted to perform an embodiment of the invention.

Similarly, the user may specify when links are elided. The user may specify that a link is elided after any selection of the link, or the user may specify that the link is only subsequently elided if a special keystroke is used, as described above. If the user selects the option to use the special keystroke, the user may enter the special keystroke in the input box provided. Alternatively, the input box may be a drop down menu or menu list of possible keystrokes, which may be used to elide links.

The source code to carry out the invention may be embodied on a computer readable medium, such as a volatile or non-volatile memory, hard disk, portable storage (e.g., floppy disks, ZIP disks, CD-ROMs, and the like), optical disk, or any other data storage device or may be downloaded over a network before use.

The invention has been described, above, principally with respect to the JavaScript programming language. However, as previously stated, other programming languages may also be used. Specifically, the invention could be implemented using the Java programming language, by extending the HTML markup language, or by extending the capabilities of web browsers, to include the requisite functionality.

The described invention is a portable and transparent system for supporting click-once, or elidable, hyperlinks with minimal interaction between the browser and the content provider. While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

The invention claimed is:

1. A method of eliding links on a web page, comprising:
receiving, by a client device, the web page sent from a server;
generating, by a web browser stored in the client device, the web page for display to include a click-once link to additional content that may only be once selected and afterwards the web page modifies itself to automatically remove the click-once link from the web page;
receiving a priority associated with the click-once link;
receiving a user input by the web browser that selects the click-once link in the web page;
self-executing, by the web browser, an elide function call before loading the additional content associated with the click-once link to remove the click-once link from the web page;
regenerating, by the web browser, the web page in an altered state to include the additional content; and
replacing, by the web browser, the click-once link from the altered state of the web page with a lower priority link;
wherein the click-once link is automatically elided by the web page after one selection.

2. The method according to claim 1, further comprising suppressing the additional content when the click-once link is elided.

3. The method according to claim 1, further comprising restoring the click-once link to the additional content.

4. The method according to claim 1, further comprising restoring the click-once link to the additional content when an error results.

5. The method according to claim 1, further comprising displaying the altered state of the web page.

6. The method according to claim 1, further comprising receiving a tag that indicates the click-once link is elidable.

7. The method according to claim 1, further comprising receiving a function call that performs elision of the click-once link.

8. A system, comprising:
a processor; and
a memory storing code that when executed causes the processor to perform operations, the operations comprising:
receiving a web page;
generating, by a web browser, the web page for display to include a click-once link to additional content in the web page that may only be once selected and afterwards the web page modifies itself to automatically remove the click-once link from the web page;
receiving a priority associated with the click-once link;
receiving a user input by the web browser that selects the click-once link in the web page;
self-executing, by the web browser, an elide function call before loading the additional content associated with the click-once link, the elide function call to remove the click-once link from the web page;
generating, after selection of the click-once link, the additional content associated with the click-once link; and
regenerating, by the web browser, the web page in an altered state that replaces the click-once link after the selection with a lower priority link;
wherein the click-once link is automatically elided from the altered state of the web page after a single selection.

9. The system according to claim 8, wherein the operations further comprise opening a new window and eliding the click-once link in the new window.

10. The system according to claim 8, wherein the operations further comprise eliding the click-once link in subsequent regenerated versions of the web page.

11. The system according to claim 8, wherein the operations further comprise reinstating the click-once link in the web page.

12. The system according to claim 8, wherein the operations further comprise calling a file when the click-once link is selected.

13. The system according to claim 8, wherein the operations further comprise restoring the click-once link to the additional content when an error results.

14. The system according to claim 8, wherein the operations further comprise receiving a tag that indicates the click-once link is elidable.

15. The system according to claim 8, wherein the operations further comprise receiving a function call that performs elision of the click-once link.

16. The system according to claim 8, wherein the operations further comprise:
storing dynamic content to a static file associated with a uniform resource locator; and
redirecting the web browser to load the static file to reduce dynamic generation of the web page.

17. The system according to claim 8, wherein the operations further comprise receiving a selection to undo elision of the click-once link.

18. The system according to claim 8, wherein the operations further comprise receiving a selection to undo all elisions of all click-once links, thus displaying all click-once links in the web page.

19. A non-transitory memory storing instructions that when executed cause a processor to perform operations, the operations comprising:
receiving a web page sent from a server to a client device;
generating, by a web browser stored in the client device, the web page for display to include a click-once link to additional content that may only be once selected and afterwards the web page modifies itself to automatically remove the click-once link from the web page;
receiving a priority associated with the click-once link;
receiving a user input that selects the click-once link in the web page;
self-executing, by the web browser, an elide function call before loading the additional content associated with the click-once link, the elide function call removing the click-once link from the web page in response to selection of the click-once link;
generating, after execution of the elide function call, the content associated with the click-once link; and
regenerating, by the web browser, the web page in an altered state that replaces the click-once link after the selection with a lower priority link;
wherein the click-once link is automatically elided by the web page after a single selection.

* * * * *